US011996247B2

(12) United States Patent
Urayama

(10) Patent No.: US 11,996,247 B2
(45) Date of Patent: May 28, 2024

(54) MULTI-DIRECTIONAL INPUT DEVICE

(71) Applicant: Alps Alpine Co., Ltd., Tokyo (JP)

(72) Inventor: Shinya Urayama, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 79 days.

(21) Appl. No.: 17/942,501

(22) Filed: Sep. 12, 2022

(65) Prior Publication Data

US 2023/0005681 A1 Jan. 5, 2023

Related U.S. Application Data

(63) Continuation of application No. PCT/JP2021/016230, filed on Apr. 21, 2021.

(30) Foreign Application Priority Data

Apr. 23, 2020 (JP) ................................. 2020-076668

(51) Int. Cl.
*H01H 19/14* (2006.01)
*H01H 19/04* (2006.01)
*H01H 25/06* (2006.01)

(52) U.S. Cl.
CPC ............ *H01H 19/14* (2013.01); *H01H 19/04* (2013.01); *H01H 25/06* (2013.01); *H01H 2215/004* (2013.01)

(58) Field of Classification Search
CPC ...... H01H 19/14; H01H 19/11; H01H 19/585; H01H 19/58; H01H 19/62; H01H 19/635;
(Continued)

(56) References Cited

U.S. PATENT DOCUMENTS 6,621,016 B2 * 9/2003 Ohba .................. H01H 25/041 200/11 R
7,550,685 B2 * 6/2009 Tsuduki ............... H01H 25/065 200/14

(Continued)

FOREIGN PATENT DOCUMENTS

JP 2007-048480 A 2/2007
JP 2009-295494 A 12/2009

(Continued)

OTHER PUBLICATIONS

International Search Report for corresponding International Application No. PCT/JP2021/016230 dated Jul. 13, 2021 (2 Pages).

*Primary Examiner* — Ahmed M Saeed
(74) *Attorney, Agent, or Firm* — Harness, Dickey & Pierce, P.L.C.

(57) ABSTRACT

A multi-directional input device has: a manipulation knob for which a movement manipulation in a horizontal direction and a pressing-down manipulation in a perpendicular direction are possible; a manipulation direction detection switch that is switched to an on-state when the movement manipulation is performed on the manipulation knob; and a common switch that is pressed down both when the movement manipulation is performed on the manipulation knob and when the pressing-down manipulation is performed on the manipulation knob, by which the common switch generates a different manipulation feeling than the manipulation direction detection switch and is switched to an on-state.

6 Claims, 13 Drawing Sheets

(58) Field of Classification Search
CPC ...... H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01; H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | | |
|---|---|---|---|---|
| 8,294,049 | B2 * | 10/2012 | Tsuduki ............... | H01H 25/065<br>200/5 R |
| 9,536,689 | B2 * | 1/2017 | Noh ........................ | H01H 25/04 |
| 2007/0029173 | A1 | 2/2007 | Sato | |
| 2021/0012985 | A1 | 1/2021 | Urayama et al. | |

FOREIGN PATENT DOCUMENTS

| | | | |
|---|---|---|---|
| JP | 2015-056254 | A | 3/2015 |
| KR | 2014-0012237 | A | 2/2014 |
| WO | 2019-198371 | A1 | 10/2019 |

* cited by examiner

FIG. 9

| SWITCH-ON SEQUENCE | | DETERMINATION | REMARKS |
|---|---|---|---|
| 1 | 2 | | |
| RUBBER DOME SWITCH | METAL DOME SWITCH | SLIDING MANIPULATION | SWITCH-ON STATE OF METAL DOME SWITCH IS IGNORED. |
| METAL DOME SWITCH | RUBBER DOME SWITCH | SLIDING MANIPULATION | SWITCH-ON STATE OF METAL DOME SWITCH IS IGNORED. |
| METAL DOME SWITCH | NO SWITCH-ON FOR CERTAIN TIME | PRESSING-DOWN MANIPULATION | |

MULTI-DIRECTIONAL INPUT DEVICE

CLAIM OF PRIORITY

This application is a Continuation of International Application No. PCT/JP2021/016230 filed on Apr. 21, 2021, which claims benefit of Japanese Patent Application No. 2020-076668 filed on Apr. 23, 2020. The entire contents of each application noted above are hereby incorporated by reference.

BACKGROUND OF THE INVENTION

1. Field of the Invention

The present invention relates to a multi-directional input device.

2. Description of the Related Art

International Publication No. WO 2019/198371 discloses a multi-directional input device that has a plurality of rubber dome switches that detect movement manipulations of a manipulation knob in a plurality of sliding manipulation directions or for tilting manipulations, and also has a metal dome switch that generates a different feeling (click feeling) than the rubber dome switches.

SUMMARY OF THE INVENTION

However, it is difficult to reduce the size and cost of the multi-directional input device described in International Publication No. WO 2019/198371. This is because, to further achieve a manipulation to press down the manipulation knob in a perpendicular direction, a detection switch for the pressing-down manipulation needs to be added besides the metal dome switch that generates a different feeling (click feeling) than the rubber dome switches.

A multi-directional input device according to an embodiment has: a manipulation knob for which a movement manipulation in a horizontal direction and a pressing-down manipulation in a perpendicular direction are possible; a manipulation direction detection switch that is switched to an on-state when the movement manipulation is performed on the manipulation knob; and a common switch that is pressed down both when the movement manipulation is performed on the manipulation knob and when the pressing-down manipulation is performed on the manipulation knob, by which the common switch generates a different manipulation feeling than the manipulation direction detection switch and is switched to an on-state.

According to an embodiment, since the number of switches used to generate a manipulation feeling can be reduced, it is possible to reduce the size and price of the multi-directional input device.

BRIEF DESCRIPTION OF THE DRAWINGS

FIG. 9 indicates an example of a determination pattern used by a control device according to an embodiment to determine what manipulation has been performed;

DESCRIPTION OF THE PREFERRED EMBODIMENTS

An embodiment will be described below with reference to the drawings.

Outline of a Multi-Directional Input Device 100

Figure 1:
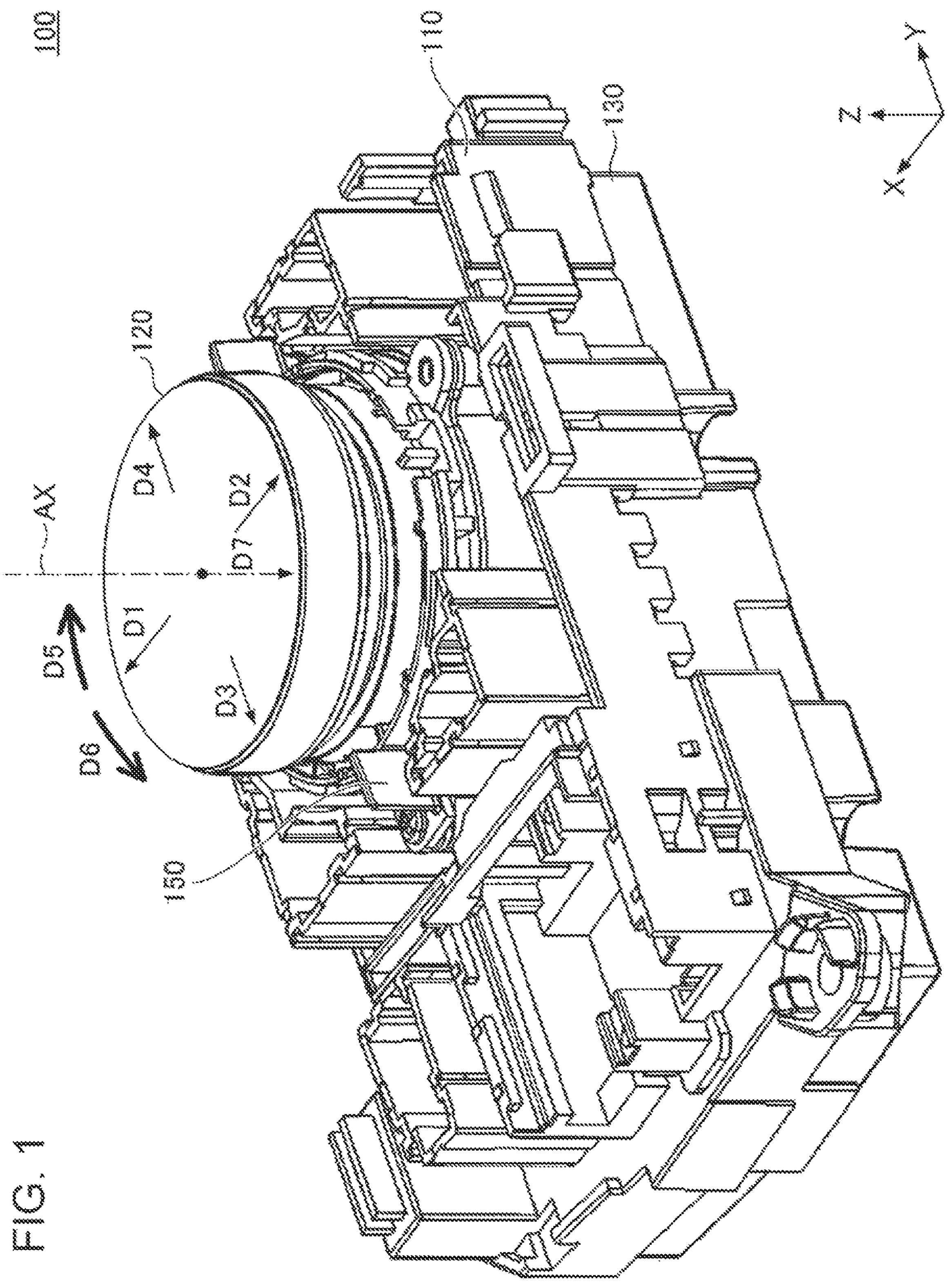
FIG. 1 is an external perspective view of a multi-directional input device according to an embodiment.

FIG. 1 is an external perspective view of a multi-directional input device 100 according to an embodiment. In the description below, a perpendicular direction will be taken as the Z-axis direction, horizontal directions will be taken as the X-axis direction and Y-axis direction. However, the X-axis direction will be taken as the front-back direction and the Y-axis direction will be taken as the left-right direction.

In the interior room of a vehicle such as, for example, an automobile, the multi-directional input device 100 illustrated in FIG. 1 is attached to a position (a center console, for example) at which a manipulation by the driver of the vehicle is possible. As illustrated in FIG. 1, the multi-directional input device 100 has a case 110 and a manipulation knob 120 in a cylindrical shape, the manipulation knob 120 being disposed so as to protrude upward (in the positive Z-axis direction) from the case 110.

The manipulation knob 120 can be used for a sliding manipulation (an example of a movement manipulation in a horizontal direction) in a first sliding manipulation direction D1 (positive X-axis direction), a second sliding manipulation direction D2 (negative X-axis direction), a third sliding manipulation direction D3 (negative Y-axis direction), and a fourth sliding manipulation direction D4 (positive Y-axis direction). The manipulation knob 120 can also be used for a pressing-down manipulation in a pressing-down manipulation direction D7 (negative Z-axis direction). Furthermore, the manipulation knob 120 can also be used for a rotational manipulation in a first rotational manipulation direction D5, which is a clockwise direction with a rotation center axis AX taken as the center, and a second rotational manipulation direction D6, which is a counterclockwise direction.

When a sliding manipulation, pressing-down manipulation, or rotational manipulation is performed on the manipulation knob 120 by the driver, the multi-directional input device 100 can control an on-board device (a navigation device, an audio device, an air-conditioner, or the like, for example) that is electrically connected to the multi-directional input device 100. The multi-directional input device 100 is not limited to use in a vehicle, but may be used in devices other than vehicles (an airplane, a railroad vehicle, a game machine, a remote controller, and the like, for example).

Structure of the Multi-Directional Input Device 100

Figure 2:
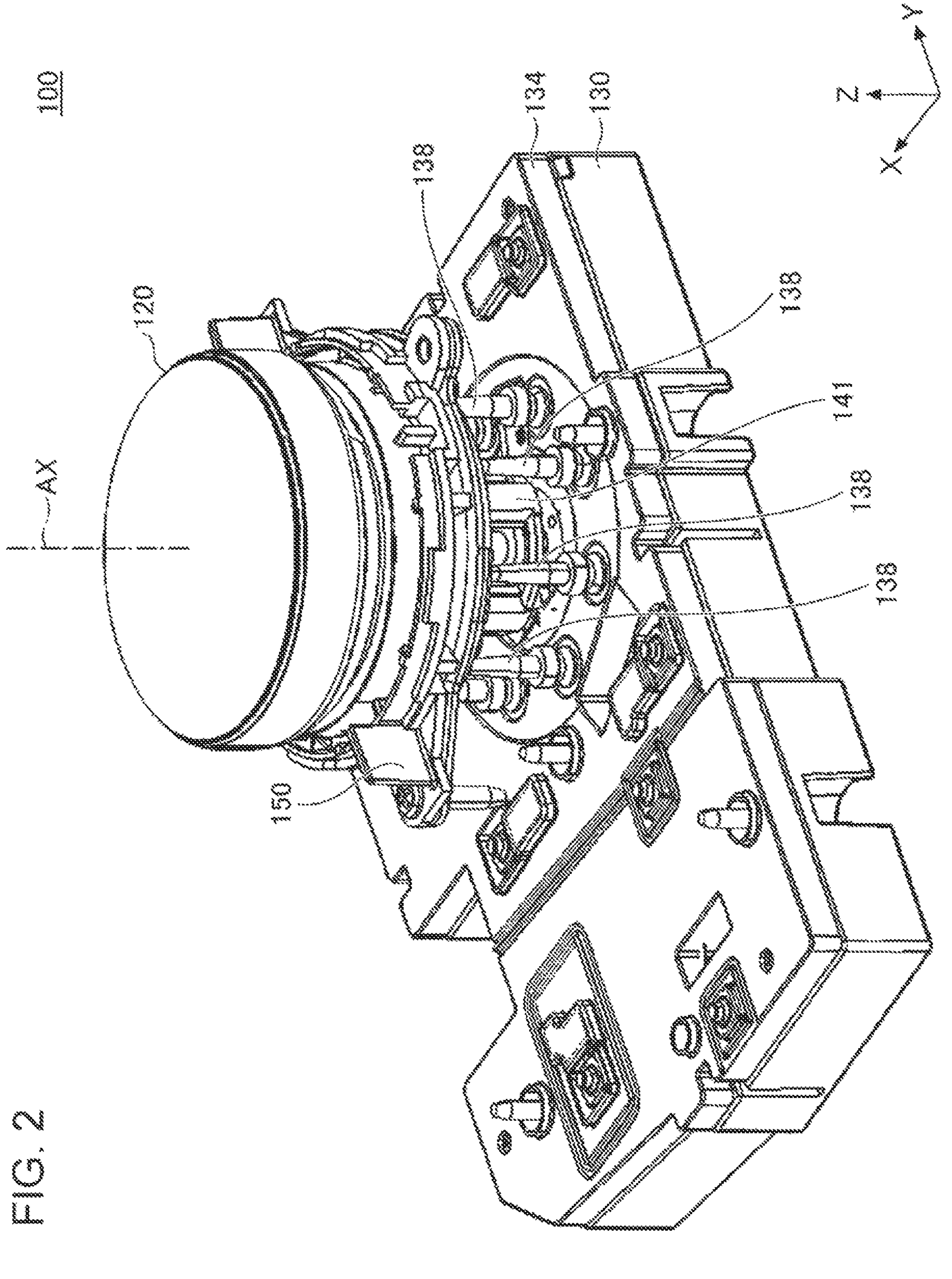
FIG. 2 is an external perspective view of the multi-directional input device according to an embodiment (in a state in which a case is removed)
Figure 3:
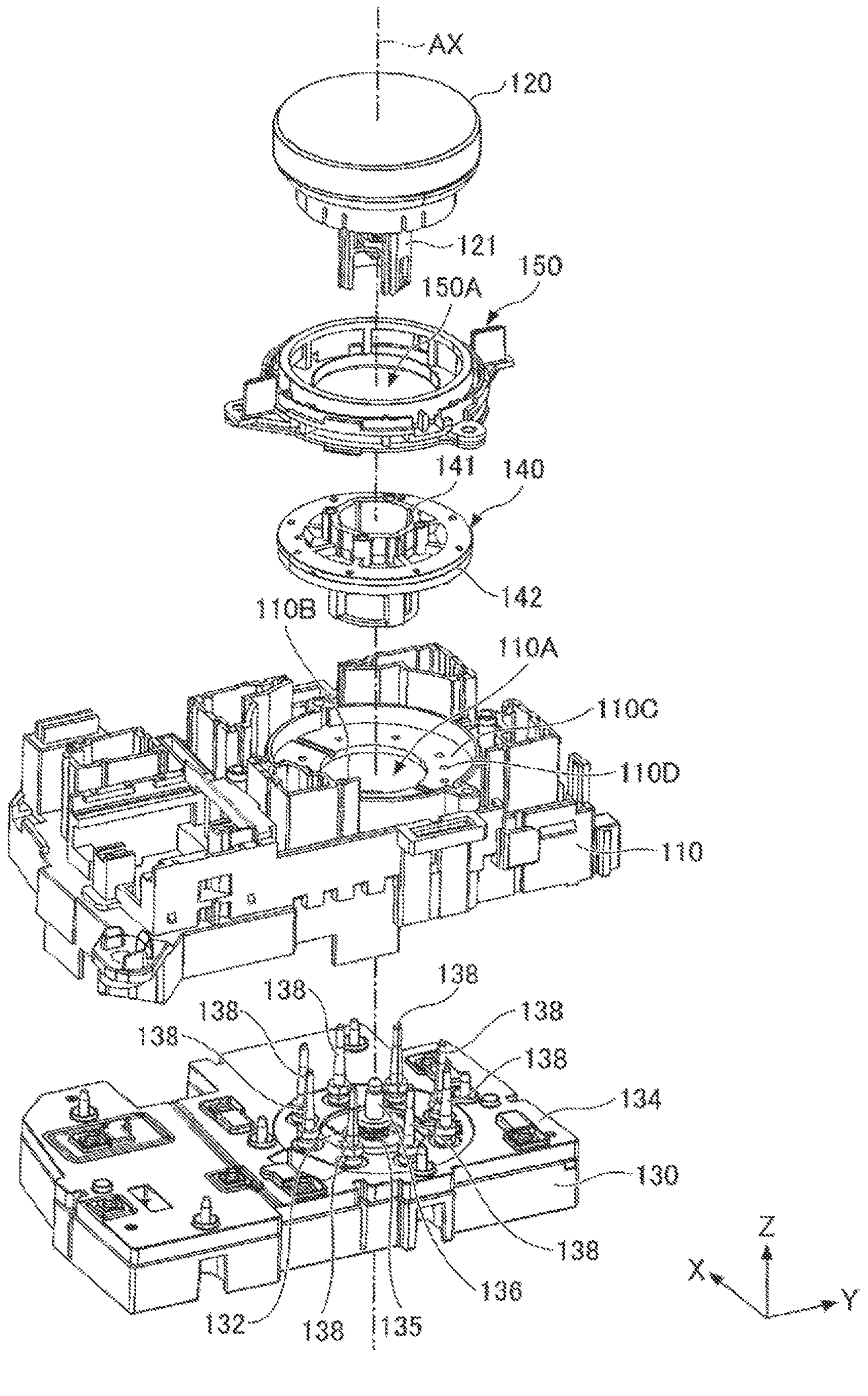
FIG. 3 is an exploded perspective view of the multi-directional input device according to an embodiment.
Figure 4:
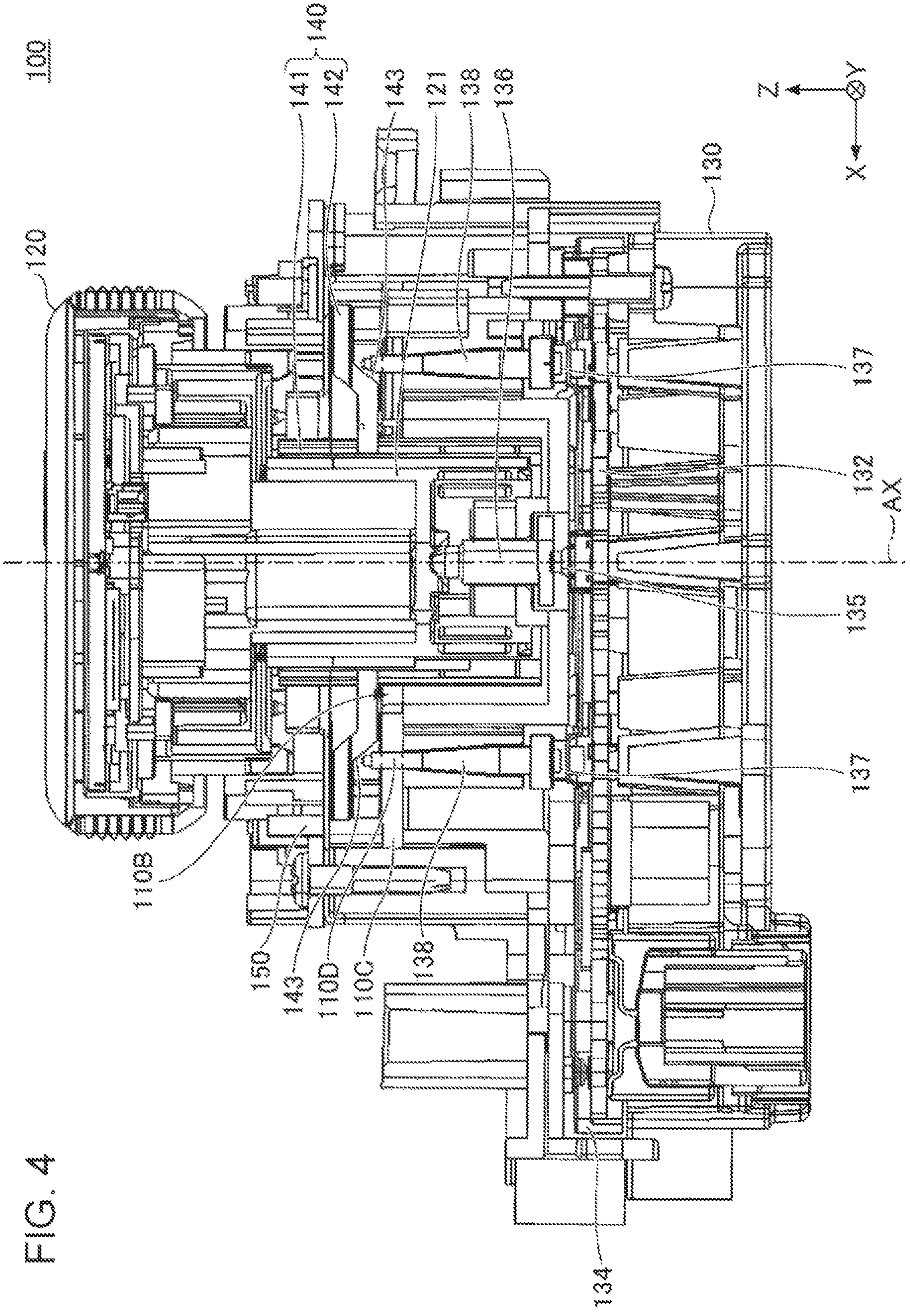
FIG. 4 is a sectional view of the multi-directional input device according to an embodiment in an XZ plane.
Figure 5:
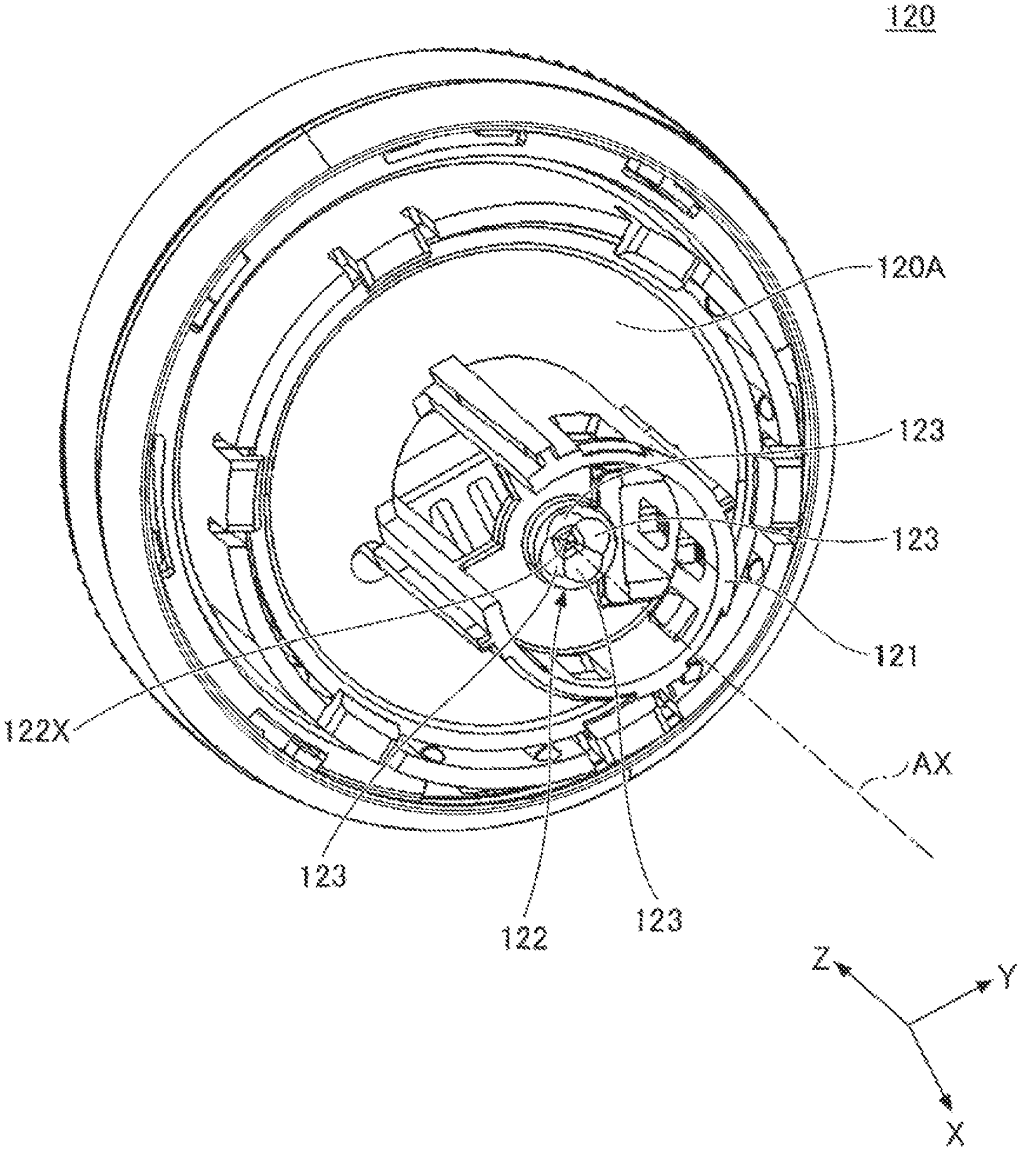
FIG. 5 is a perspective view of a manipulation knob included in the multi-directional input device according to an embodiment when viewed from the bottom surface side (negative Z-axis side) of the knob.
Figure 6:
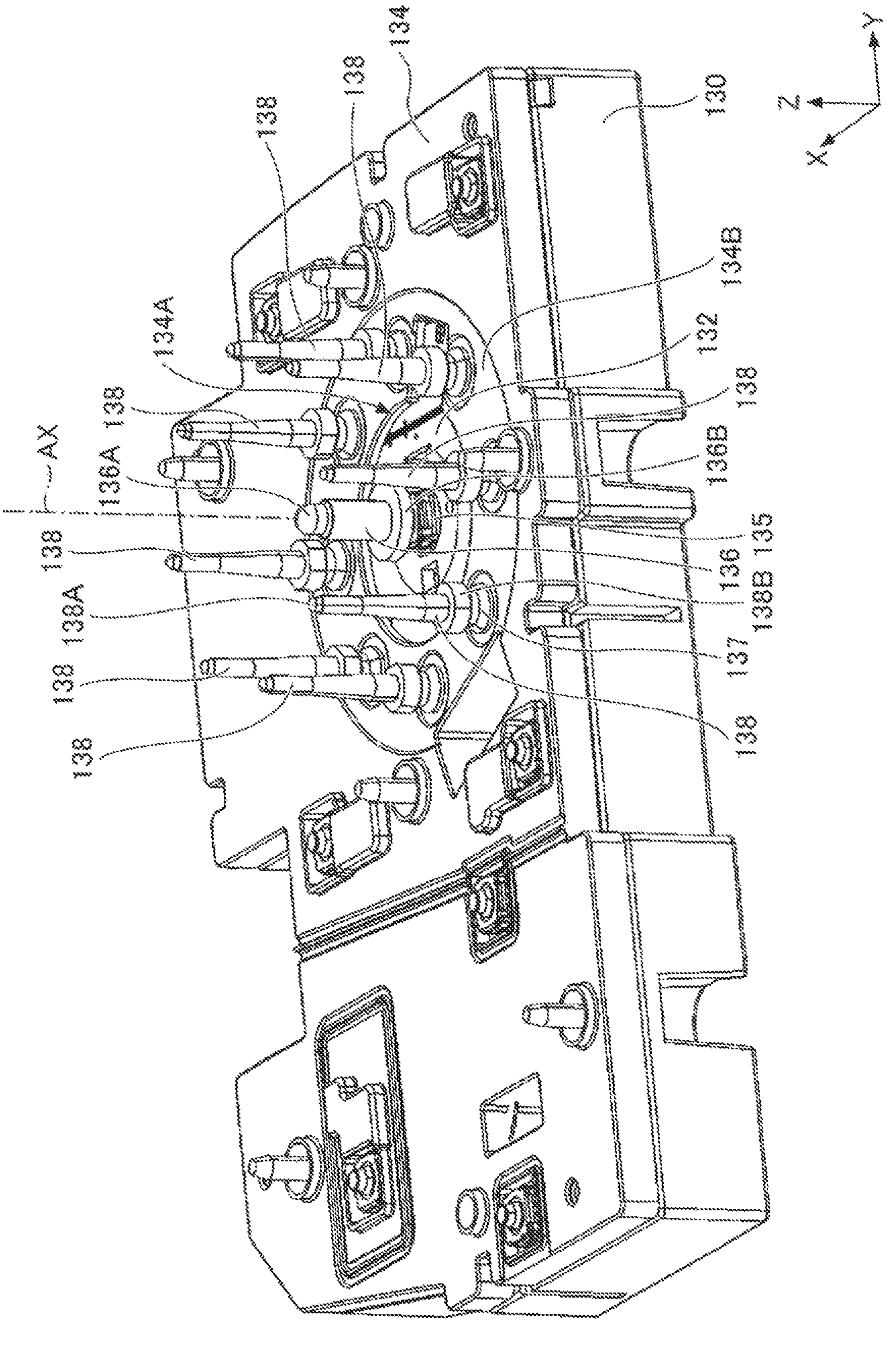
FIG. 6 is a perspective view of an under-cover included in the multi-directional input device according to an embodiment has and of various types of constituent parts provided on the upper surface side of the under-cover.
Figure 7:
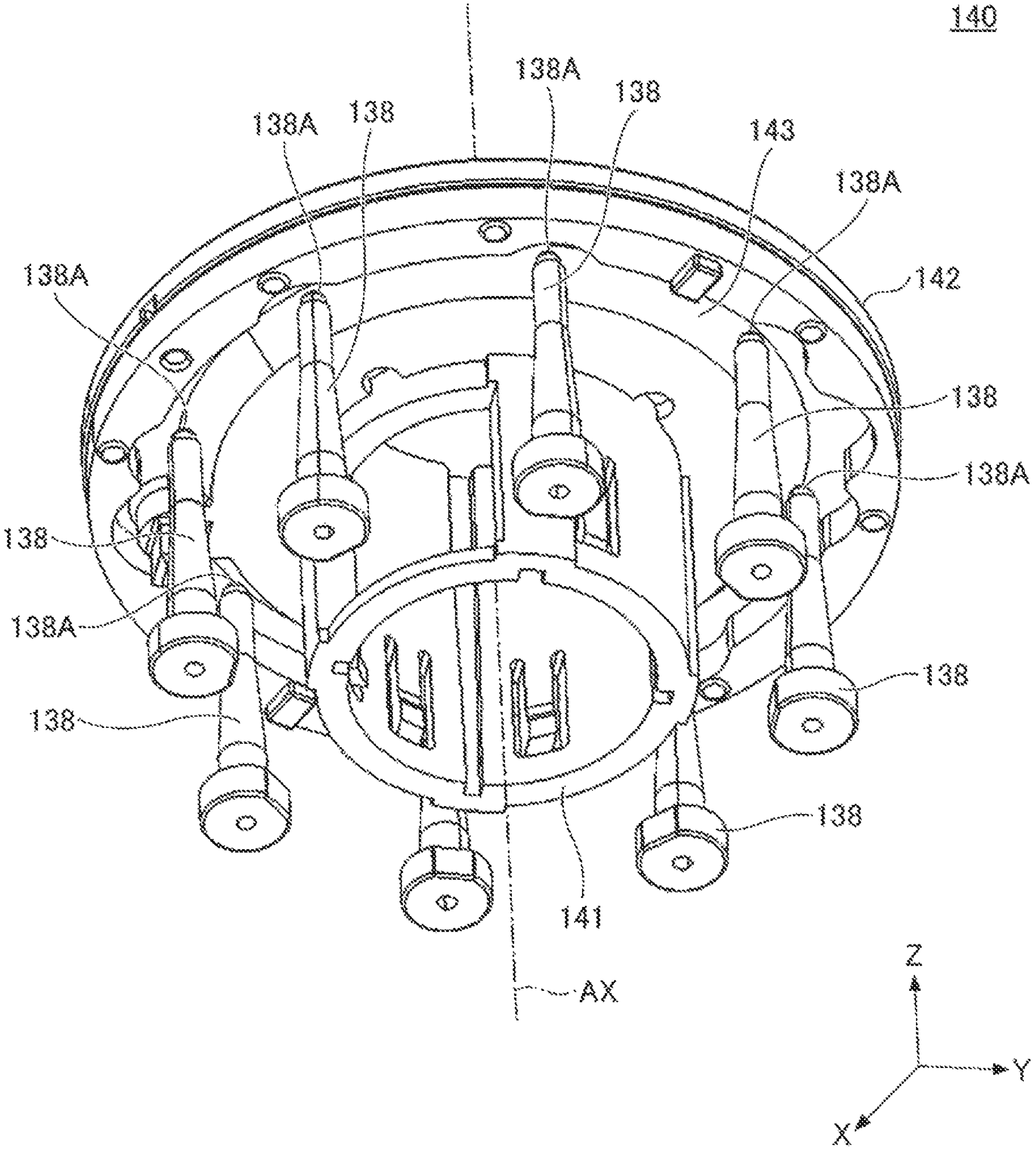
FIG. 7 is a perspective view of an inclination plate included in the multi-directional input device according to an embodiment when viewed from the bottom surface side (negative Z-axis side) of the inclination plate.

FIG. 2 is an external perspective view of the multi-directional input device 100 according to an embodiment (in a state in which the case 110 is removed). FIG. 3 is an exploded perspective view of the multi-directional input device 100 according to an embodiment. FIG. 4 is a sectional view of the multi-directional input device 100 according to an embodiment in an XZ plane. FIG. 5 is a perspective view of the manipulation knob 120 included in the multi-directional input device 100 according to an embodiment when viewed from the bottom surface side (negative Z-axis side) of the manipulation knob 120. FIG. 6 is a perspective view of an under-cover 130 included in the multi-directional input device 100 according to an embodiment and of various types of constituent parts provided on the upper surface side of the under-cover 130. FIG. 7 is a perspective view of a cam member 140 included in the multi-directional input device 100 according to an embodiment when viewed from the bottom surface side (negative Z-axis side) of the cam member 140.

As illustrated in FIG. 3, the multi-directional input device 100 according an embodiment has the manipulation knob 120, a holder 150, the cam member 140, the case 110, and the under-cover 130 sequentially from above in the drawing.

Case 110

The case 110 is a box-like member, the upper side and lower side of which are open. An opening in the case 110 on the lower side is blocked by the under-cover 130. Therefore, various types of constituent parts (push-rods 138, rubber dome switches 137, and the like) provided on the upper surface side of the under-cover 130 are stored in an inner space 110A in the case 110. For example, the case 110 is formed by being injection-molded from a resin material such as an acrylonitrile butadiene styrene (ABS) resin or a polycarbonate resin. An opening portion 110B in a circular shape with the rotation center axis AX taken as the center and an area 110C, which encloses the opening portion 110B, in a ring shape are formed in the case 110. A disc portion 142 of the cam member 140 is placed on the upper surface of the area 110C. At this time, a bearing portion 141 of the cam member 140 is inserted into an opening portion 110B. The outer diameter of the bearing portion 141 of the cam member 140 is smaller than the inner diameter of the opening portion 110B. The outer diameter of the disc portion 142 of the cam member 140 is smaller than the outer diameter of the area 110C. Therefore, the cam member 140 is disposed so as to be horizontally movable in each movement manipulation direction (sliding manipulation direction) in the opening portion 110B and on the area 110C. The area 110C has a plurality of through-holes 110D formed at equal intervals on the same circumference. The push-rod 138 is inserted into the through-hole 110D from the lower side. This enables an upper end 138A of the push-rod 138 to protrude from the upper surface of the area 110C through the through-hole 110D. In this embodiment, eight through-holes 110D are formed at equal intervals (that is, at 45° intervals) on the same circumference, in correspondence to eight push-rods 138.

Manipulation Knob 120

The manipulation knob 120 is a manipulation member, in a columnar shape, which undergoes a sliding manipulation, pressing-down manipulation, and rotational manipulation by the manipulator. As illustrated in FIGS. 3 and 5, an axial portion 121 in a cylindrical shape is provided at the central portion of a bottom surface 120A of the manipulation knob 120 so as to hand down. The axial portion 121 is placed by being inserted into the cylinder of the bearing portion 141 included in the cam member 140. When a pressing-down manipulation is performed on the manipulation knob 120, the axial portion 121 reciprocates in the cylindrical interior of the bearing portion 141 in the up-down direction (Z-axis direction).

In the manipulation knob 120, a cam 122 is provided at the center (that is, on the rotation center axis AX) in the cylindrical interior of the axial portion 121, as illustrated in FIG. 5. The cam 122 is an example of a first cam portion that moves together with the manipulation knob when it undergoes a movement manipulation or pressing-down manipulation. When a sliding manipulation or pressing-down manipulation is performed on the manipulation knob 120, an upper end 136A (see FIG. 6), in a semispherical shape, of an actuator 136 placed on the lower side of the cam 122 is pressed down, by which the metal dome switch 135 disposed on the lower side of the actuator 136 can be pressed down through the actuator 136.

The cam 122 is formed in an upward concave shape as illustrated in FIG. 5. The cam 122 has a central portion 122X and also has four first cam surfaces 123 in correspondence to the four sliding manipulation directions D1 to D4 of the manipulation knob 120. The first cam surface 123 is an example of a first cam surface that presses down a first pressing-down member when a movement manipulation is performed on the manipulation knob. The central portion 122X presses down the upper end 136A, in a semispherical shape, of the actuator 136 when a pressing-down manipulation is performed on the manipulation knob 120.

Each of the four first cam surfaces 123 extends from the central portion 122X in the relevant manipulation direction (one of the four sliding manipulation directions) of the manipulation knob 120 while inclining downward. Each of the four first cam surfaces 123 presses down the upper end 136A, in a semispherical shape, of the actuator 136 when a sliding manipulation is performed on the manipulation knob 120.

The four first cam surfaces 123 have the same shape, that is, each of the four first cam surfaces 123 has a sector shape forming 90° with respect to the rotation center axis AX in plan view from below. In the example illustrated in FIG. 5, each of the four first cam surfaces 123 is a curved surface. Therefore, an amount by which the actuator 136 is pressed down is linearly increased as the amount of sliding of the manipulation knob 120 is increased.

The manipulation knob 120 has a rotational manipulation mechanism for which a rotational manipulation is possible. Specifically, the axial portion 121 of the manipulation knob 120 does not rotate with respect to the case 110, but the manipulation knob 120 is structured so that a rotational manipulation is possible with a substantially columnar member alone, the columnar member being disposed above the axial portion 121. Therefore, when a rotational manipulation is performed on the manipulation knob 120, the cam 122 disposed on the axial portion 121 also does not rotate with respect to the case 110. When a rotational manipulation is performed on the manipulation knob 120, a rotational manipulation detection signal is output to a circuit board 132 through a harness (not illustrated).

Under-Cover 130

The under-cover 130 is a member, in a flat plate shape, that covers the opening in the case 110 on its lower side. On the upper surface of the under-cover 130, the circuit board 132 in a flat plate shape is laminated, as illustrated in detail in FIG. 6. On the upper surface of the circuit board 132, a rubber mat 134, in a flat plate shape, which is formed by using an elastic material (rubber, silicone, or the like, for example) is laminated.

In the rubber mat 134, an opening portion 134A in a circular shape with the rotation center axis AX taken as the center is formed. Part of the circuit board 132 is exposed from the opening portion 134A. The metal dome switch 135 is disposed at a position, on the rotation center axis AX, on the part of the circuit board 132. The metal dome switch 135 is a push switch having a metal dome that can present a click manipulation feeling.

The actuator 136 is disposed above the metal dome switch 135 so as to be movable in the up-down direction (Z-axis direction). The actuator 136 is an example of the first pressing-down member and is a member, in a columnar shape, that extends in the up-down direction (Z-axis direction). The upper end 136A of the actuator 136 is in a semispherical shape. A lower end 136B of the actuator 136 is in a discoid shape. When a manipulation (sliding manipulation or pressing-down manipulation) is performed on the manipulation knob 120, the actuator 136 is pressed down by the cam 122 (see FIG. 5) disposed in the manipulation knob 120. Therefore, when a manipulation (sliding manipulation or pressing-down manipulation) is performed on the manipulation knob 120, the actuator 136 can press down the metal dome switch 135 disposed on the lower side and can switch the metal dome switch 135 to an on-state. The metal dome switch 135 may be an example of a common switch. Specifically, both when a movement manipulation is performed on the manipulation knob 120 in a horizontal direction and when a pressing-down manipulation is performed on the manipulation knob 120 in the perpendicular direction, the metal dome switch 135 is pressed down by the actuator 136, by which the metal dome switch 135 generates a different manipulation feeling than the rubber dome switch 137 and is switched to the on-state.

On the rubber mat 134, a plurality of rubber dome switches 137 are placed in an area 134B, in a ring shape, which encloses the opening portion 134A so as to be arranged on the same circumference with the rotation center axis AX taken as the center. Each of the plurality of rubber dome switches 137 may be an example of a manipulation direction detection switch. Above each of the plurality of rubber dome switches 137, the push-rod 138 substantially in a columnar shape is disposed so as to be movable in the up-down direction (Z-axis direction). The push-rod 138 is an example of a second pressing-down member and is a member, in a rod shape, that extends in the up-down direction (Z-axis direction). The upper end 138A of the push-rod 138 is in a semispherical shape. A lower end 138B of the push-rod 138 is in a discoid shape.

When a manipulation (sliding manipulation) is performed on the manipulation knob 120, each of the plurality of push-rods 138 is pressed down by the cam member 140. Therefore, when a manipulation (sliding manipulation) is performed on the manipulation knob 120, each of the plurality of push-rods 138 can push down the relevant rubber dome switch 137 disposed on the lower side and can switch the rubber dome switch 137 to an on-state. The rubber dome switch 137 has a convex shape protruding upward. The rubber dome switch 137 is pressed down by the push-rod 138 and is thereby elastically deformed, by which the rubber dome switch 137 can bring a movable contact (not illustrated) included in that the rubber dome switch 137 into contact with two fixed contacts (not illustrated) disposed immediately below the rubber dome switch 137 on the upper surface of the circuit board 132 and can switch the two fixed contacts to a mutually conductive state (that is, the on-state). In the example in FIG. 6, eight rubber dome switches 137 are placed in the area 134B at equal intervals (that is, at 45° intervals). According to this, in the example in FIG. 6, eight push-rods 138 are placed at equal intervals (that is, at 45° intervals) on the same circumference with the rotation center axis AX taken as the center.

Cam Member 140

The cam member 140 is an example of a second cam portion. The cam member 140 is provided so as to be movable together with the manipulation knob 120 in horizontal directions with respect to the case 110. The cam member 140 also supports the manipulation knob 120 so as to be movable in the up-down direction. The cam member 140 has the bearing portion 141 and disc portion 142. The disc portion 142 is mounted in an area 110C, in a ring shape, which is formed around the opening portion 110B in the case 110. At this time, the bearing portion 141 is inserted into the opening portion 110B. Therefore, the cam member 140 is disposed so as to be horizontally movable in each sliding manipulation direction in the opening portion 110B and on the area 110C.

A second cam surface 143 in a ring shape with the rotation center axis AX taken as the center in plan view from below is provided on the bottom surface side of the disc portion 142 of the cam member 140, as illustrated in FIG. 7. The second cam surface 143 is an example of a second cam surface that moves together with the manipulation knob when it moves in a horizontal direction. The second cam surface 143 is an inclined surface inclined so that the radius from the rotation center axis AX gradually becomes large upward. On the lower side of the second cam surface 143, a plurality of (eight in this embodiment) push-rods 138 are placed at equal intervals (that is, at 45° intervals) on the same circumference with the rotation center axis AX taken as the center, as illustrated in FIG. 7. The upper end 138A, in a semispherical shape, of each of the plurality of (eight in this embodiment) push-rods 138 abuts the second cam surface 143. Therefore, when a sliding manipulation is performed on the manipulation knob 120, the cam member 140 moves in the sliding manipulation direction together with the manipulation knob 120, by which the push-rod 138 disposed in the sliding manipulation direction can be pressed down by the second cam surface 143.

Holder 150

The holder 150 is a member, substantially in a ring shape, that has an opening portion 150A in a circular shape with the rotation center axis AX taken as the center. The holder 150 is fixed to the case 110 by being screwed into it. The holder 150 slidably abuts the upper surface of the cam member 140 in a state in which the cam member 140 is placed in the opening portion 110B in the case 110. In the opening portion 110B, therefore, the holder 150 slidably holds the cam member 140. The axial portion 121 of the manipulation knob 120 and the bearing portion 141 of the cam member 140 are inserted into the opening portion 150A in the holder 150.

Electrical Connection Structure of the Multi-Directional Input Device 100

Figure 8:
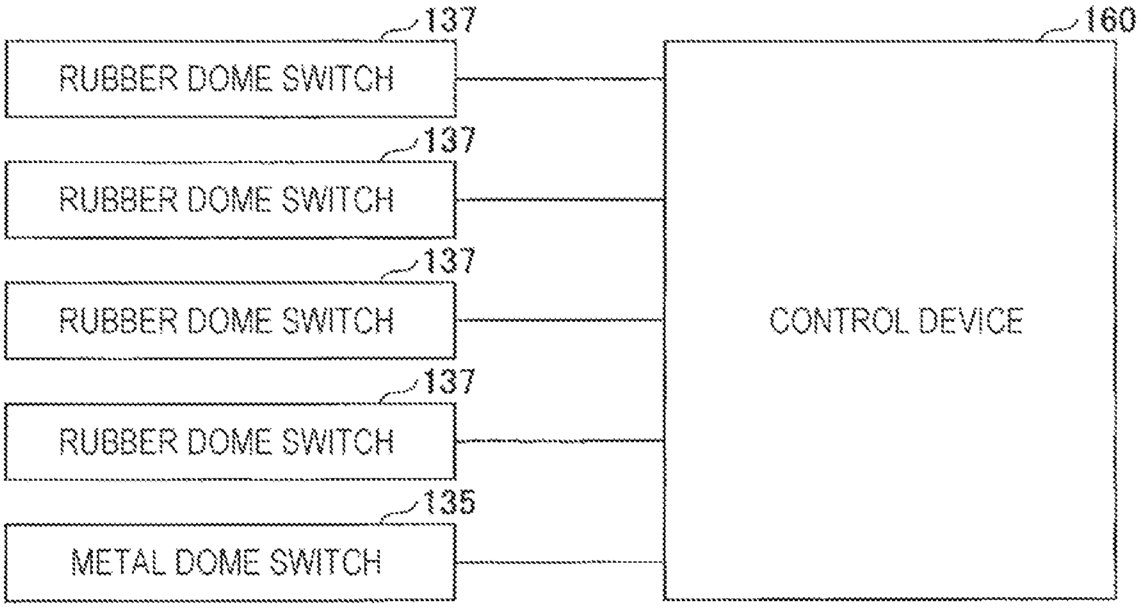
FIG. 8 illustrates the electrical connection structure of the multi-directional input device according to an embodiment.

FIG. 8 illustrates the electrical connection structure of the multi-directional input device 100 according to an embodiment. As illustrated in FIG. 8, the multi-directional input device 100 has a control device 160. The control device 160 is electrically connected to the one metal dome switch 135 and the four rubber dome switches 137 corresponding to the four manipulation directions D1 to D4 of the manipulation knob 120. The control device 160 can detect the state (on-state or off-state) of each of a plurality of switches 137 and 135. The control device 160 can determine what manipulation has been performed on the manipulation knob 120 by the manipulator according to the detection result of the states of the plurality of switches 137 and 135. The control device 160 can then execute predetermined processing according to the determination result.

The multi-directional input device 100 according to an embodiment has eight rubber dome switches 137 in correspondence to eight sliding manipulation directions of the manipulation knob 120. However, since the multi-directional input device 100 according to an embodiment is structured so that the cam 122 of the manipulation knob 120 has four first cam surfaces 123 in correspondence to four sliding manipulation directions, a sliding manipulation in each of the four sliding manipulation directions of the manipulation knob 120 can be detected. With the multi-directional input device 100 according to an embodiment, therefore, when the cam 122 of the manipulation knob 120 is structured so as to have eight first cam surfaces 123 in correspondence to the eight sliding manipulation directions, it is possible to detect a sliding manipulation in each of the eight sliding manipulation directions of the manipulation knob 120.

Example of a Determination Pattern for Manipulations

FIG. 9 indicates an example of a determination pattern used by the control device 10 according to an embodiment to determine what manipulation has been performed.

When the control device 160 detects a switch-on of a rubber dome switch 137 and then detects the switch-on of the metal dome switch 135, the control device 160 ignores the switch-on of the metal dome switch 135 and determines that a sliding manipulation has been performed on the manipulation knob 120, as illustrated in FIG. 9. Then, the control device 160 executes predetermined processing matching the sliding manipulation on the manipulation knob 120. In this case, since the predetermined processing matching the sliding manipulation is executed after the detection of the switch-on of the metal dome switch 135, the manipulator can better understand, from a sound and a click manipulation feeling generated by the metal dome switch 135, that a sliding manipulation has been surely performed.

When the control device 160 detects the switch-on of the metal dome switch 135 and then detects the switch-on of a rubber dome switch 137 before the elapse of a predetermined period of time (0.5 second, for example), the control device 160 ignores the switch-on of the metal dome switch 135 and determines that a sliding manipulation has been performed on the manipulation knob 120. Then, the control device 160 executes predetermined processing matching the sliding manipulation on the manipulation knob 120. This is because it is assumed that the manipulator may perform a sliding manipulation while putting the manipulator's weight on the manipulation knob 120. Since the first switch-on of the metal dome switch 135 is not involved in a pressing manipulation that the manipulator has in mind, the switch-on is ignored.

When a predetermined period of time (0.5 second, for example) elapses after the control device 160 detects the switch-on of the metal dome switch 135 without detecting the switch-on of a rubber dome switch 137, the control device 160 determines that a pressing-down manipulation has been performed on the manipulation knob 120. The control device 160 then executes predetermined processing matching the pressing-down manipulation on the manipulation knob 120.

Figure 10:
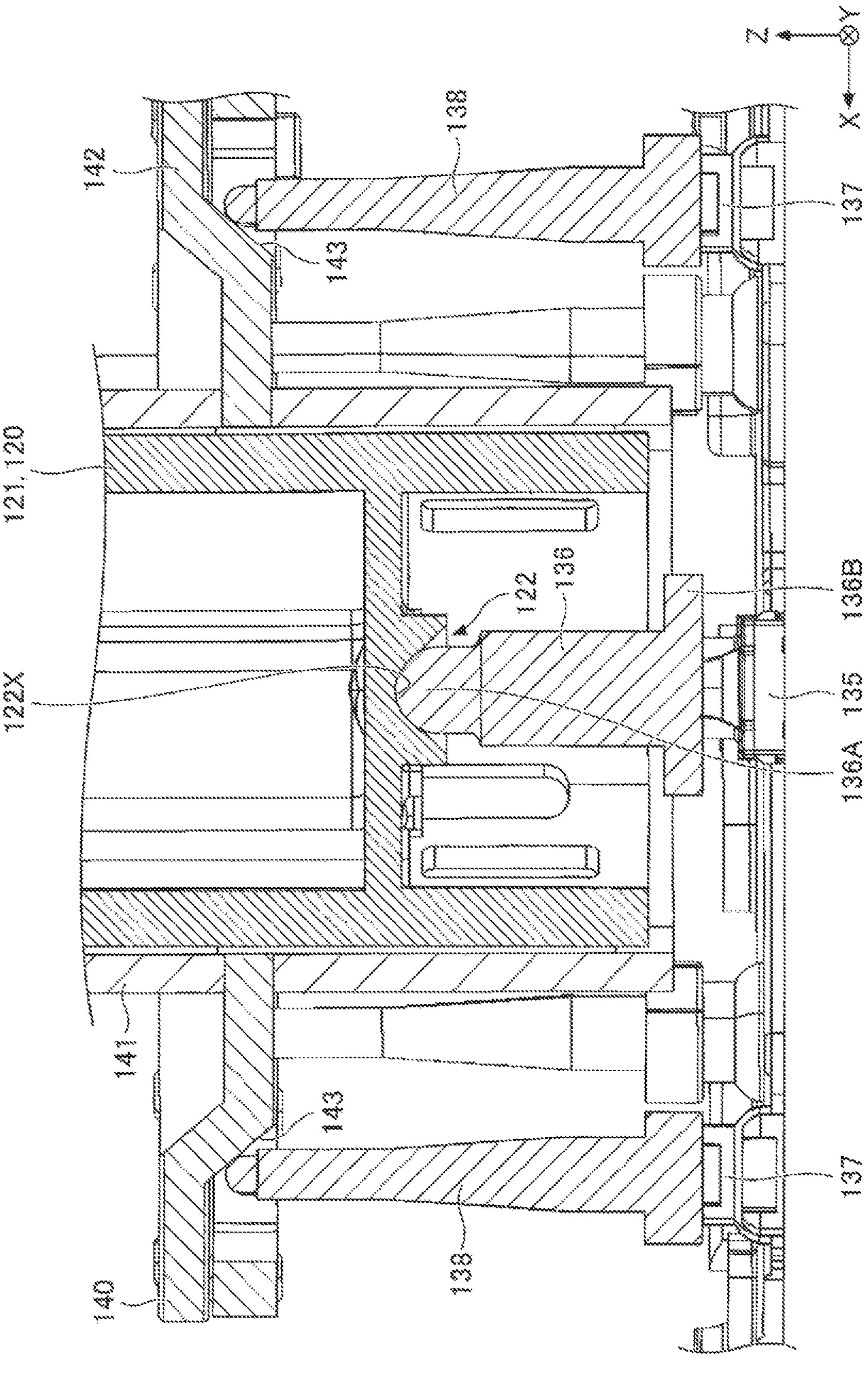
FIG. 10 is a sectional view of the multi-directional input device (in a state in which a manipulation has yet to be performed) according to an embodiment in an XZ plane.
Figure 11:
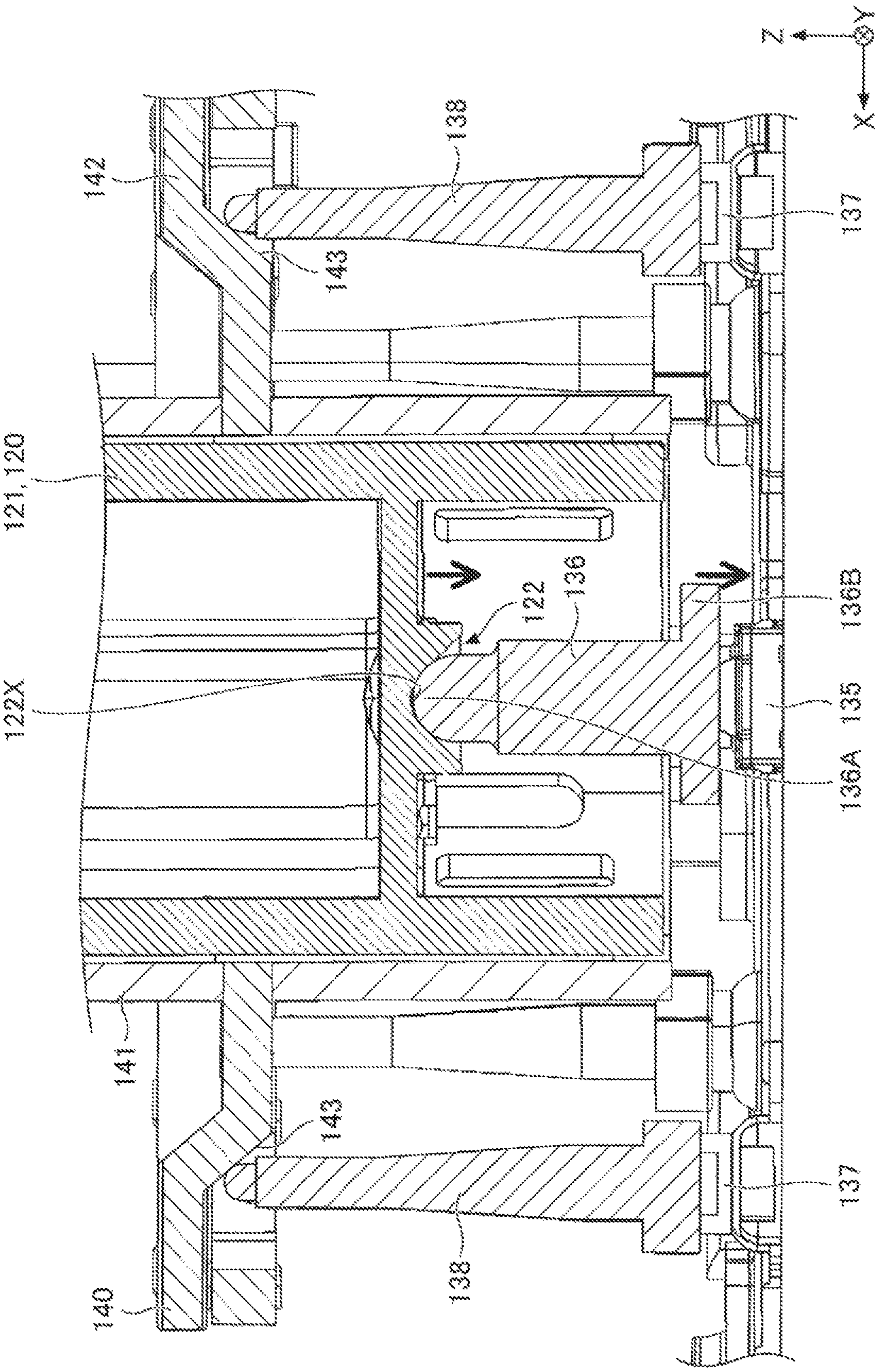
FIG. 11 is a sectional view of the multi-directional input device (in a state in which a manipulation has been performed) according to an embodiment in an XZ plane.

Operation of the Multi-Directional Input Device 100 at the Time of a Pressing-Down Manipulation Next, the operation of the multi-directional input device 100 at the time of a pressing-down manipulation on the manipulation knob 120 will be described with reference to FIGS. 10 and 11. FIG. 10 is a sectional view of the multi-directional input device 100 (in a state in which a manipulation has yet to be performed) according to an embodiment in an XZ plane. FIG. 11 is a sectional view of the multi-directional input device 100 (in a state in which a manipulation has been performed) according to an embodiment in an XZ plane.

Since the multi-directional input device 100 has the structure described with reference to FIGS. 1 to 9, when a pressing-down manipulation is performed downward (in the negative Z-axis direction) on the manipulation knob 120, the multi-directional input device 100 operates as described below.

First, as illustrated in FIG. 11, the axial portion 121 of the manipulation knob 120 moves downward (in the negative Z-axis direction) in the cylindrical interior of the bearing portion 141 of the cam member 140, after which the cam 122 disposed at the center (that is, on the rotation center axis AX) of the cylinder of the axial portion 121 of the manipulation knob 120 presses down the upper end 136A of the actuator 136 on the central portion 122X.

The actuator 136 presses down the metal dome switch 135 disposed on the lower side of the actuator 136 with the bottom surface of the lower end 136B, in a discoid shape, of the actuator 136 so as to switch the metal dome switch 135 to the on-state. At this time, a sound and a click manipulation feeling generated by the metal dome switch 135 are transmitted to the hand of the manipulator through the actuator 136 and manipulation knob 120.

Then, the control device 160 (see FIG. 8), which has been electrically connected to the metal dome switch 135, detects that the metal dome switch 135 has been switched to the on-state, determines that a pressing-down manipulation has been performed on the manipulation knob 120, and executes predetermined processing matching the pressing-down manipulation on the manipulation knob 120. An example of predetermined processing is to output, to an on-board device eligible for control, a signal indicating that a pressing-down manipulation has been performed on the manipulation knob 120.

When the pressing-down manipulation on the manipulation knob 120 by the manipulator is canceled, the metal dome switch 135 is switched to the off-state. Then, the manipulation knob 120 is pushed upward due to a recovery force generated by the metal dome switch 135 at that time, and the manipulation knob 120 returns to the predetermined initial position indicated in FIG. 10.

When a pressing-down manipulation is performed on the manipulation knob 120, the axial portion 121 of the manipulation knob 120 moves downward independently of the cam member 140. Therefore, when a pressing-down manipulation is performed on the manipulation knob 120, the cam member 140 does not move downward and any of the plurality of rubber dome switches 137 is not thereby pressed.

Figure 12:
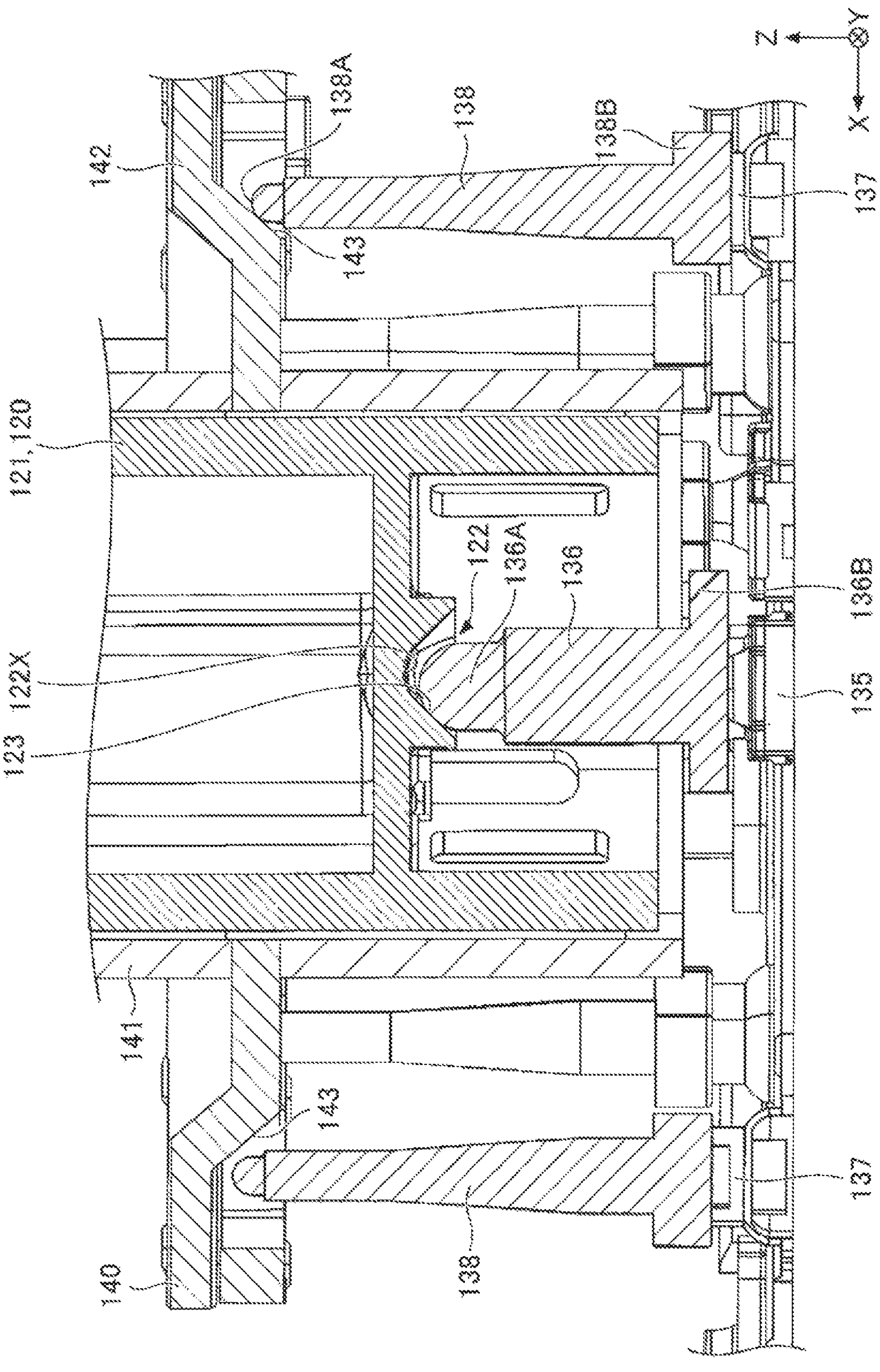
FIG. 12 is a sectional view of the multi-directional input device (in a state in which a sliding manipulation has been performed and only a rubber dome switch is in an on-state) according to an embodiment in an XZ plane.
Figure 13:
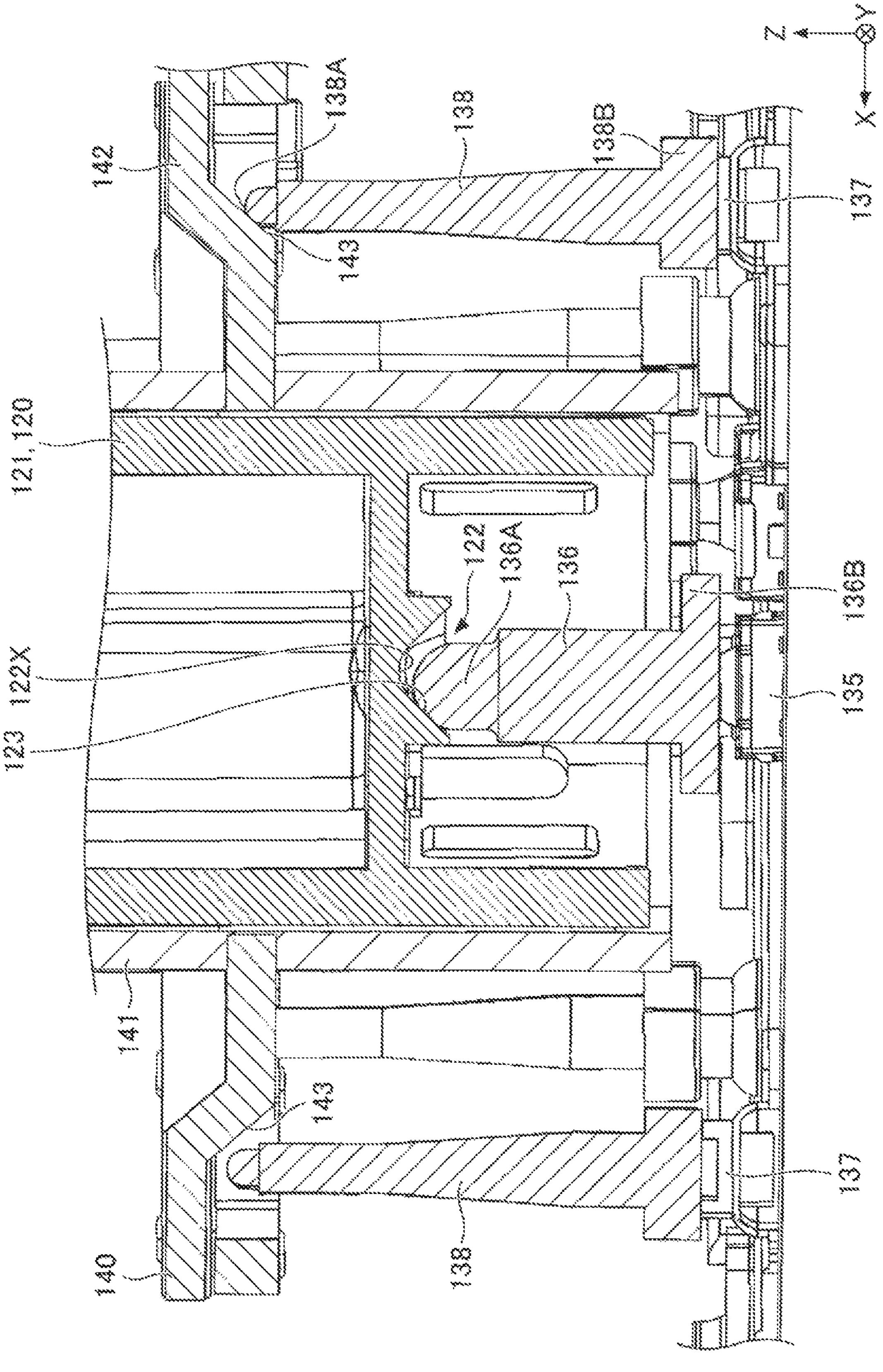
FIG. 13 is a sectional view of the multi-directional input device (in a state in which a sliding manipulation has been performed, and furthermore, a metal dome switch is also in an on-state) according to an embodiment in an XZ plane.

Operation of the Multi-Directional Input Device 100 During a Sliding Manipulation Next, the operation of the multi-directional input device 100 during a sliding manipulation on the manipulation knob 120 will be described with reference to FIGS. 10, 12, and 13. FIG. 12 is a sectional view of the multi-directional input device 100 (in a state in which a sliding manipulation has been performed and only a rubber dome switch 137 is in the on-state) according to an embodiment in an XZ plane. FIG. 13 is a sectional view of the multi-directional input device 100 (in a state in which a sliding manipulation has been performed, and furthermore, a metal dome switch 135 is also in the on-state) according to an embodiment in an XZ plane.

Since the multi-directional input device 100 has the structure described with reference to FIGS. 1 to 9, when a sliding manipulation is performed on the manipulation knob 120 by the manipulator in any of the four sliding manipulation directions D1 to D4, the multi-directional input device 100 operates as described below.

The operation of the multi-directional input device 100 will be described below, assuming that a sliding manipulation has been performed in the second sliding manipulation direction D2 (negative X-axis direction) as an example. However, the multi-directional input device 100 also operates similarly when a sliding manipulation has been performed in another sliding manipulation direction D1, D3, or D4.

First, as illustrated in FIG. 12, the cam member 140 moves in the second sliding manipulation direction D2 (negative X-axis direction) together with the axial portion 121 of the manipulation knob 120, and the second cam surface 143 disposed on the bottom surface side of the disc portion 142 of the cam member 140 presses down the upper end 138A of the push-rod 138 on the negative X-axis side.

The push-rod 138 on the negative X-axis side presses down the rubber dome switch 137 disposed on the lower side of the push-rod 138 on the negative X-axis side with the bottom surface of the lower end 138B, in a discoid shape, of the push-rod 138 so as to switch the rubber dome switch 137 to the on-state.

Then, the control device 160 (see FIG. 8), which has been electrically connected to the rubber dome switch 137, detects that the rubber dome switch 137 has switched to the on-state. At the same time, the cam member 140 moves in the second sliding manipulation direction D2 (negative X-axis direction) together with the axial portion 121 of the manipulation knob 120, by which the cam 122 disposed at the central portion (that is, on the rotation center axis AX) in the cylindrical interior of the axial portion 121 of the manipulation knob 120 presses down the upper end 136A of the actuator 136 with the first cam surfaces 123 of the cam 122 on the positive X-axis side, as illustrated in FIG. 12. The actuator 136 presses down the metal dome switch 135 disposed on the lower side of the actuator 136 with the bottom surface of the lower end 136B, in a discoid shape, of the actuator 136. However, since the first cam surface 123 is shaped so that even at a point in time at which the rubber dome switch 137 is switched to the on-state, the amount of movement of the actuator 136 does not exceed a stroke needed to switch the metal dome switch 135 to the on-state, the metal dome switch 135 is not switched to the on-state.

After that, as illustrated in FIG. 13, the cam member 140 further moves in the second sliding manipulation direction D2 (negative X-axis direction) together with the axial portion 121 of the manipulation knob 120 while the rubber dome switch 137 remains in the on-state. Then, the cam 122 disposed at the central portion (that is, on the rotation center axis AX) in the cylindrical interior of the axial portion 121 of the manipulation knob 120 further presses down the upper end 136A of the actuator 136 with the first cam surfaces 123 of the cam 122 on the positive X-axis side.

The actuator 136 presses down the metal dome switch 135 disposed on the lower side of the actuator 136 with the bottom surface of the lower end 136B, in a discoid shape, of the actuator 136 so that metal dome switch 135 is switched to the on-state. At this time, a sound and a click manipulation feeling generated by the metal dome switch 135 are transmitted to the hand of the manipulator through the actuator 136 and manipulation knob 120.

Then, the control device 160 (see FIG. 8), which has been electrically connected to the metal dome switch 135, detects that the metal dome switch 135 has been switched to the on-state. The control device 160 determines that a sliding manipulation has been performed on the manipulation knob 120 in the second sliding manipulation direction D2 (negative X-axis direction), based on the detection result that the rubber dome switch 137 has been switched to the on-state and on the detection result that the metal dome switch 135 has been switched to the on-state, and executes predetermined processing matching the sliding manipulation on the manipulation knob 120 in the second sliding manipulation direction D2. An example of predetermined processing is to output, to an on-board device eligible for control, a signal indicating that a sliding manipulation has been performed on the manipulation knob 120 in the second sliding manipulation direction D2 (negative X-axis direction).

When the sliding manipulation on the manipulation knob 120 by the manipulator is canceled, the rubber dome switch 137 and metal dome switch 135 are switched to the off-state. Then, the manipulation knob 120 is pushed upward due to recovery forces generated by the rubber dome switch 137 and metal dome switch 135 at that time, and the manipulation knob 120 returns to the predetermined initial position indicated in FIG. 10.

As described above, with the multi-directional input device 100 according an embodiment, when a sliding manipulation is performed on the manipulation knob 120, the rubber dome switch 137 is first pressed down by the push-rod 138 and is placed in the on-state, after which the metal dome switch 135 is pressed down by the actuator 136 and is placed in the on-state. Thus, with the multi-directional input device 100 according an embodiment, even when a sliding manipulation is performed on the manipulation knob 120, it is possible to present a sound and a click manipulation feeling to the manipulator with the metal dome switch 135. Timings at which to press down the rubber dome switch 137 and metal dome switch 135 and timings at which to shift the rubber dome switch 137 and metal dome switch 135 to the on-state can be varied by setting the inclination angles of the cam surfaces 123 and 143 and other parameters in consideration of the amounts of strokes of the rubber dome switch 137 and metal dome switch 135.

As described above, the multi-directional input device 100 according to an embodiment has: the manipulation knob 120 for which a movement manipulation in a horizontal direction and a pressing-down manipulation in a perpendicular direction are possible; the rubber dome switch 137 that is switched to the on-state when the sliding manipulation is performed on the manipulation knob 120; and the metal dome switch 135 that is pressed down both when the sliding manipulation is performed on the manipulation knob 120 and when the pressing-down manipulation is performed on the manipulation knob 120, by which the metal dome switch 135 generates a different manipulation feeling than the rubber dome switch 137 and is switched to the on-state.

With the multi-directional input device 100 according to an embodiment, therefore, a sound and a click manipulation feeling can be generated by a single metal dome switch 135 both in a sliding manipulation on the manipulation knob 120 and in a pressing-down manipulation on the manipulation knob 120. Therefore, the multi-directional input device 100 in an embodiment can reduce the number of switches used to generate a manipulation feeling can be reduced, making it possible to reduce the size and price of the multi-directional input device 100.

This completes the description of an embodiment of the present invention. However, the present invention is not limited to the embodiment. Various variations and modifications are possible without departing from the intended scope, described in the claims, of the present invention.

For example, with the multi-directional input device 100 according to an embodiment, a movement manipulation on the manipulation knob 120 in a horizontal direction has been a sliding manipulation. However, an inclination fulcrum may be provided on the rotation center axis AX of the manipulation knob 120 to perform an inclination manipulation.

What is claimed is:

1. A multi-directional input device comprising:

a manipulation knob configured to accept a movement manipulation in a horizontal direction and a pressing-down manipulation in a perpendicular direction;

a manipulation direction detection switch that is switched to an on-state when the movement manipulation is performed on the manipulation knob;

a common switch that is pressed down both when the movement manipulation is performed on the manipulation knob and when the pressing-down manipulation is performed on the manipulation knob, by which the common switch generates a different manipulation feeling than the manipulation direction detection switch and is switched to an on-state;

a first cam portion that moves together with the manipulation knob when the manipulation knob undergoes the movement manipulation in the horizontal direction and when the manipulation knob undergoes the pressing-down manipulation in the perpendicular direction; and a first pressing-down member that presses down the common switch when the first cam portion moves in the horizontal direction and when the first cam portion moves in the perpendicular direction; wherein the first cam portion has a central portion that presses down the first pressing-down member when the pressing-down manipulation is performed on the manipulation knob, and a first cam surface that extends from the central portion in a direction of the movement manipulation in the horizontal direction while the first cam surface inclines downward, the first cam surface pressing down the first pressing-down member when the movement manipulation is performed on the manipulation knob in the horizontal direction.

2. The multi-directional input device according to claim 1, further comprising:

a second cam portion having a second cam surface that moves together with the manipulation knob when the manipulation knob undergoes the movement manipulation in the horizontal direction; and a second pressing-down member that presses down the manipulation direction detection switch by being pressed down by the second cam surface when the second cam portion moves in the horizontal direction.

3. The multi-directional input device according to claim 2 wherein:

when the pressing-down manipulation is performed on the manipulation knob, the first cam portion moves in a pressing-down manipulation direction and the first cam portion presses down the first pressing-down member, by which the common switch is pressed down; and when the movement manipulation is performed on the manipulation knob in the horizontal direction, both the first cam portion and the second cam portion move in the direction of the movement manipulation in the horizontal direction and the second cam portion presses down the second pressing-down member, by which the manipulation direction detection switch is pressed down and is switched to the on-state, after which, when the first cam portion further presses down the first pressing-down member, the common switch is pressed down and is switched to the on-state.

4. The multi-directional input device according to claim 1, wherein the common switch is a metal dome switch.

5. The multi-directional input device according to claim 1, wherein the manipulation direction detection switch is a rubber dome switch.

6. A multi-directional input device comprising:

a manipulation knob configured to accept a movement manipulation in a horizontal direction and a pressing-down manipulation in a perpendicular direction;

a manipulation direction detection switch that is switched to an on-state when the movement manipulation is performed on the manipulation knob;

a common switch that is pressed down both when the movement manipulation is performed on the manipulation knob and when the pressing-down manipulation is performed on the manipulation knob, by which the common switch generates a different manipulation feeling than the manipulation direction detection switch and is switched to an on-state; and a control unit; wherein when the control unit detects a switch-on of the common switch and then detects a switch-on of a manipulation direction detection switch before an elapse of a predetermined period of time, the control unit ignores the switch-on of the common switch and determines that the movement manipulation has been performed on the manipulation knob in the horizontal direction, and after the control unit detects the switch-on of the common switch, when the control unit does not detect the switch-on of the manipulation direction detection switch before the elapse of the predetermined period of time, the control unit determines that the pressing-down manipulation has been performed on the manipulation knob.

* * * * *